United States Patent [19]
Brown et al.

[11] 3,860,784
[45] Jan. 14, 1975

[54] DEEP PENETRATION WELDING USING LASERS

[75] Inventors: Clyde O. Brown, Newington; Conrad M. Banas, Manchester, both of Conn.

[73] Assignee: United Aircraft Corporation, East Hartford, Conn.

[22] Filed: Mar. 14, 1973

[21] Appl. No.: 341,009

Related U.S. Application Data
[63] Continuation of Ser. No. 122,070, March 8, 1971, abandoned.

[52] U.S. Cl. .......................................... 219/121 LM
[51] Int. Cl. ............................................. B23k 27/00
[58] Field of Search... 219/121 L, 121 LM, 121 EB, 219/121 EM; 331/94.5 A

[56] References Cited
UNITED STATES PATENTS
| | | | |
|---|---|---|---|
| 2,987,610 | 6/1961 | Steigerwald.................. | 219/121 EM |
| 3,404,253 | 10/1968 | Anderson et al. ........... | 219/121 LM |

OTHER PUBLICATIONS
"Laser Welders" Electronics 10/64 pp. 96–100.

"The $CO_2$ Laser" Design Engineering 5/69, pp. 47–49.

"Laser Techniques for Metals Joining" Welding Journal 11/63 pp. 481-S–488-S:

"Laser Beam Fusion Welding" Welding Journal 3/64 pp. 97-S–102-S.

*Primary Examiner*—J. V. Truhe
*Attorney, Agent, or Firm*—Donald F. Bradley

[57] ABSTRACT

A $TEM_{oo}$ mode laser beam is focused on a material to be welded to a power density sufficiently high, depending upon the material of the workpiece, so that deep penetration welding occurs producing a weld having a depth-to-width ratio substantially greater than 1. To initiate the weld, the incident power density and power must be sufficiently high to overcome the relatively high reflectivity of metallic workpieces. With relative movement between the workpiece and the beam, seam welding can be performed, as well as lap welding and blind welding.

4 Claims, 2 Drawing Figures

DEEP PENETRATION WELDING USING LASERS

This is a continuation of application Ser. No. 122,070, filed Mar. 8, 1971, now abandoned.

BACKGROUND OF THE INVENTION

1. Field of the Invention

This invention relates to welding, and specifically to welding by means of a laser beam. Deep penetration welds with a high depth-to-width ratio may be produced under the proper conditions.

2. Description of the Prior Art

Welding by means of focused beams of electrons is well known in the art, and has been performed commercially for many years. With the invention of the laser, it occurred to many investigators that a focused beam of coherent light could also be used for welding, and many reports of successful welds produced by a laser beam have appeared. However, until the present invention, deep penetration welds, commonly produced by electron beam technology, have not been accomplished using a laser beam. The phenomenon of deep penetration welding with electron beams was discovered by Steigerwald and is the subject of U.S. Pat. No. 2,987,610 to which reference may be had for a complete description of this phenomenon. In general, prior to the discovery of the deep penetration welding phenomenon, welding was performed even with electron beams purely by heat conduction rather than by direct energy transfer. In heat conduction welds, energy is delivered to the material surface and propagates into the material by thermal conduction. Conduction is a relatively slow process and proceeds uniformly in all directions from the source in a homogeneous material. Weld speed is therefore limited and the weld exhibits a hemispherical appearance with a width approximately equal to the depth. With the discovery of the deep penetration electron beam welding where welding occurs by direct energy transfer, it was possible to produce deep, narrow welds with a depth-to-width ratio of 20 to 1 or more. With this type of weld, metallurgical damage to portions of the workpiece adjacent the weld are prevented, and stronger, cleaner welds are produced. Thermal distortion is also minimized since minimum energy is used to effect the weld. With the advent of deep penetration welding, the field of electron beam welding and its use by industry increased tremendously.

A disadvantage of electron beam welding is that a complex and expensive vacuum chamber is required for most welds because the available focused power density of the moving electrons diminishes rapidly in the atmosphere due to collisions with air molecules. Recently, advances have been made in nonvacuum welding machines, but a vacuum chamber is still required to generate the electron beam, and the workpiece must be placed immediately adjacent the exit of the electron beam from the vacuum chamber in so-called nonvacuum welding situations. This restricts the geometry of possible weldments, and the depth-to-width ratio of the welds is reduced.

It has been known that laser welding has an advantage over electron beam welding in that no vacuum chamber is required for the workpiece since the laser beam is readily propagated through the atmosphere. An additional advantage of laser beam welding is that the laser beam may be reflected, focused and directed much more readily than a similar electron beam. Further, no x-ray shielding is required as in electron beam equipment. However, until the present invention, it was not possible to perform deep penetration welding with a laser beam, thereby restricting laser welding to heat conduction type welds which, in many cases, could as easily be performed by conventional welding apparatus. The high cost of powerful laser equipment does not readily justify its use for simple heat conduction welds.

Many investigators have reported experiments with laser welders, but with little practical success. Since until the present it was not possible to produce deep penetration welds with a laser, successful welding was limited to thin materials, and welds produced in thicknesses of engineering significance were either slowly produced or of unacceptable quality. The unavailability of high power laser equipment also reduced the powers available to the experiments and restricted the depth to which even conventional heat conduction welds could be made. Furthermore, the fact that metal surfaces often reflect a high percentage of the impinging laser beam led many investigators to conclude that deep penetration welding could not be produced with a laser beam. For example, in "Machine Design," Oct. 15, 1970 at page 136 et seq., the authors indicate that lasers are not good instruments for welding metals thicker than a thin sheet, and that a thickness of 0.04 inch is generally considered the practical upper limit for laser welding. The article concludes that the electron beam is more practical to industry for metal working.

Some experimenters have used pulsed-type lasers for their experimentation, but in addition to the reflectivity problem, the pulse durations presently available limit attainable welds to about 1/16 inch thickness. This is due to the extremely high power densities attained which tend to vaporize material at the workpiece and drill through rather than produce the melting and flowing required for a weld. Continuous lasers do not have this limitation and produce a much more controllable beam which obviates many of the disadvantages of the pulsed laser in welding applications.

SUMMARY OF THE INVENTION

The present invention overcomes the disadvantages of both electron beam welding systems and prior laser welding systems which could not produce deep penetration welds.

In accordance with the present invention, a $CO_2$ laser amplifies a laser beam in the $TEM_{oo}$ mode. The laser beam is focused by suitable transmitting or reflecting optics onto the workpiece material to be welded. The laser beam is focused so that it has a power density at the point of impingement on the workpiece material of $10^6 \lesssim P/A \lesssim 10^8$ watts/in.$^2$ where P is the laser power and A is the area of the focal spot. Beam powers in the range of 3 kilowatts are required for significant penetration. Effective or deep penetration welding will be produced by relative movement between the laser beam and the workpiece at a rate given by $V \geq 10d/t_{exp}$, where d is the diameter of the laser at the focal spot, and $t_{exp}$ is the characteristic time for material vaporization and expulsion (resulting in hole drilling) as governed by incident power and power density.

Further in accordance with the present invention, reflection of the laser beam from the workpiece caused by the high reflectivity of the material to be welded must be overcome before deep penetration welding can take place. Consequently, it is required for laser deep penetration welding that the region in the workpiece material directly under the focused spot be heated to its vaporization temperature in a time equal to, or less than, the characteristic thermal diffusion time in the region. In this manner the characteristically high metal reflectivity for laser radiation is reduced, and its absorption increased. The required power density increases in proportion to the thermal diffusivity of the material.

DESCRIPTION OF THE PREFERRED EMBODIMENT

Figure 1:
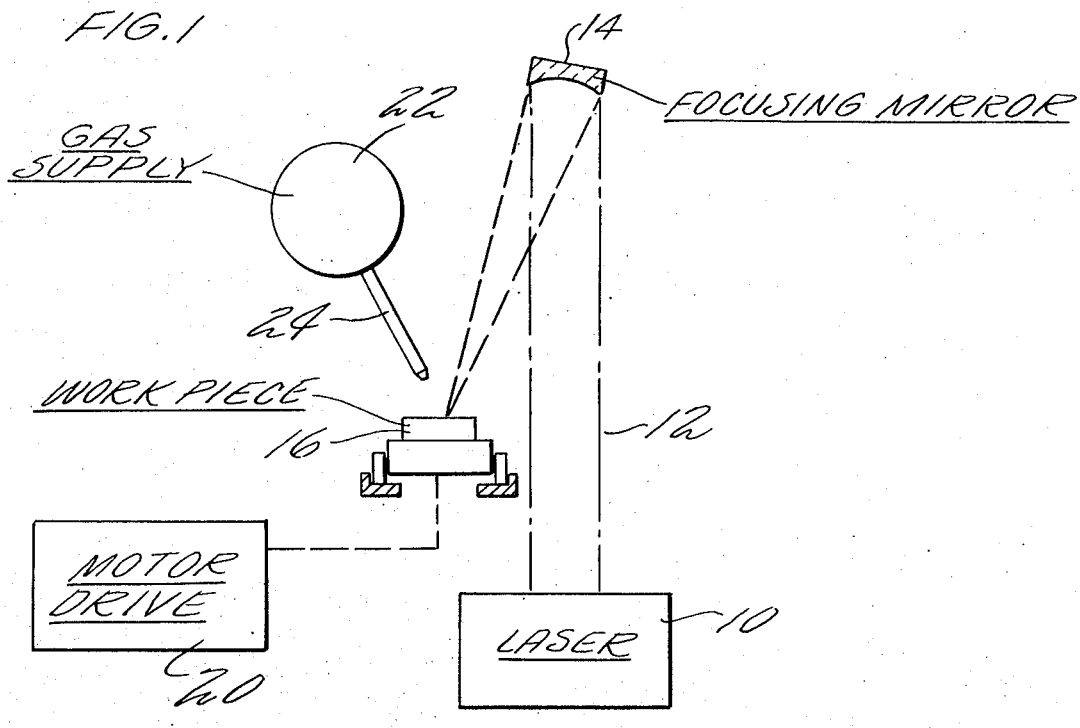
FIG. 1 is a schematic plan view of the laser welding apparatus.

Deep penetration welds, heretofore possible only with electron beam welding systems, are characterized by depth-to-width ratios substantially greater than unity, by a small heat affected zone, by high strength and by minimum heat input to the workpiece. Attainment of such welds is dependent primarily on providing a sufficiently high power and power density at the material surface. Before the present invention, this high power density could only be realized with electron beam equipment.

Until about 1965, deep penetration welds could only be accomplished by electron beams with the workpiece located in a high vacuum system. Thus, the workpiece size and welding speed were severely limited by vacuum chamber characteristics. The recent development of nonvacuum electron beam welding equipment extended the capability of this welding technique to atmospheric conditions. In nonvacuum systems, differentially pumped chambers and an aerodynamic window are used to bring the electron beam from the high vacuum chamber into the atmospheric pressure working environment. Due to beam scattering by atmospheric density gas, however, the attainable beam power density decreases significantly with increases in working distance from the beam exit orifice. This factor presently limits out of vacuum electron beam welding distances to approximately one-half inch, and thereby restricts the geometry of the workpiece which can be welded by this technique. Further, because of the reduced beam power density caused by spreading of the beam in a high pressure environment, nonvacuum electron beam welds exhibit a smaller depth-to-width ratio than ones obtained at identical beam powers in a vacuum. Weld penetration capabilities decrease accordingly. An additional disadvantage of electron beam welding is that x-ray shielding must be provided over the entire workpiece area.

In contrast to electron beam welding, laser welding offers the following advantages: first, the energy beam may be transmitted for appreciable distances through the atmosphere without serious attenuation or impairment of focusing capability; second, a vacuum chamber for the workpiece is not required; third, x-rays are not generated upon impingement of the beam on the workpiece; and fourth, the beam may be readily deflected, focused and shaped with ordinary reflective and/or refractive optics. A disadvantage of laser welding is that most metals are highly reflective at the wavelengths generated by presently available high power CW lasers. Because of this fact, many investigators have concluded that it would be impossible to attain deep penetration welds with lasers, or that, if such welding was possible, it would require extremely high powers due to the losses caused by the reflection of the beam.

In ordinary welding processes such as oxy-acetylene, MIG, TIG, submerged arc, etc., thermal energy is supplied to the material surface and is then transported into the material by thermal conduction. Since thermal flow proceeds uniformly in all directions from the surface in homogeneous materials the weld zone exhibits a depth-to-width ratio of approximately unity. For this reason a large heat affected zone results, large energy inputs are required, and thermal distortion may occur.

For sufficiently high incident power densities, attainable only with electron or laser beam equipment, a void can be established in the material so that energy is deposited throughout the material thickness. Multiple reflections occur within the void with partial absorption on each reflection. Thus, energy is distributed along the surface of the void with the large number of reflections serving to insure essentially complete absorption. The void generated is not statically stable and would result in creation of a hole if relative motion between the beam and the workpiece did not occur. If the workpiece is moved relative to the welding beam at a speed of at least 10 focused spot diameters in the time required for material expulsion, i.e., $V \geq 10d/t_{exp}$, the void becomes dynamically stable and translates through the material with solidification occurring directly behind it. Characteristics of the weld formed can be predicted on the basis of the assumption of a moving line heat source distributed through the material. The width of the weld zone is of the order of the beam spot size, and its depth is proportional to the incident power. The unique characteristic of this welding process is represented by depth-to-width value substantially greater than unity.

FIG. 1 shows a typical configuration for producing deep penetration welds with a laser beam. A laser 10, such as a $CO_2$ laser operating at 10.6 microns wavelength, generates a high power $TEM_{oo}$ beam 12 which impinges on a focusing element 14 and is directed therefrom to impinge on a workpiece 16 positioned at the focus of the beam. The workpiece is situated on a worktable 18 which is movable relative to the laser beam by means of a motor drive 20 connected to the worktable to produce smooth, continuous motion. Inert gas 22 may be fed through line 24 to the vicinity of the workpiece 16 to prevent undesirable reactions at the surface of the workpiece.

The workpiece 16 will be described as two metallic pieces which are to be seam welded by virtue of the movement of worktable 18 relative to the laser beam. Other types of welding may also be performed as is known in the art. The fixturing of the workpieces and the apparatus for providing movement thereof are well known in the electron beam welding art, and will not be described in detail.

The laser 10 may be any type of laser oscillator or amplifier which can produce a beam which can attain power densities within the limits $10^6 \leq P/A \leq 10^8$ watts/in.² at powers of about 3 kilowatts or more. This will normally require that the laser operate in the $TEM_{oo}$ mode so that focused spot diameters can be produced which approach the theoretical diffraction-limited minimum defined as $d = 2.44 \lambda f/D$ where $\lambda$ is the radiation wavelength, $f$ is the focal length, and D is the beam aperture. Since the energy distribution in the $TEM_{oo}$ mode is Gaussian with maximum energy at the beam center, it facilitates establishment of the void which is characteristic of the deep penetration process. Higher order modes, in which a large fraction of the beam energy may occur in the outer portion of the beam, lead to excessive energy deposition at the edges of the weld which can lead to disruption of the deep penetration process and can result in a "wine glass" cross section with a reduced weld depth, or in a shallow heat conduction weld.

An important factor to be considered in laser welding, as opposed to electron beam welding, is that the reflectivity of most metals at the wavelengths of present high power laser operation is quite high and may in some instances exceed 90 percent. Clearly, if efficient welding by means of the deep penetration effect is to be realized, this problem must be circumvented. A procedure not necessary in electron beam welding is therefore required.

It is noted that the surface reflectivity R of a typical pure metallic material at the long wavelengths of present high CW power lasers is proportional to the square root of its electrical conductivity, i.e., in first approximation, reflectivity is inversely proportional to the square root of temperature. Since reflectivity is a complex function of the chemical and physical state of the surface, this relationship is precisely valid only for highly polished specimens of pure material. Actual surface behavior, however, follows this general trend so that the relationship serves as a guideline. Since the absorptance A for opaque materials is given by
$$A = 1 - R,$$
the laser energy absorbed increases with temperature in accordance with the relationship
$$A \approx A_o \sqrt{1 + \alpha (T-T_o)}$$ where $A_o$ is the
absorptance at the reference temperature, $T_o$, $T$ is the temperature of the workpiece, and $\alpha$ is a constant whose value depends on the material. The fraction of laser energy absorbed by the material therefore increases with temperature. The absorptances percentages of numerous materials as a function of temperature is available in the literature.

Absorption also increases significantly when the material changes from solid to liquid. Upon vaporization of the material, a void is created which further enhances absorption by virtue of radiation trapping due to multiple reflections. Achievement of this latter condition leads to essentially complete absorption.

In order to establish the deep welding void, it is required that sufficient energy be delivered to the initial weld point to overcome losses caused by the material reflectivity. Energy deposition must be localized to permit the material at the focal point of the beam to vaporize in a time less than the characteristic thermal diffusion time of the material. In other words, the material at the focal point of the beam must vaporize before sufficient energy has been conducted into the surrounding material to cause the typical melting characteristic of normal heat conduction welding. If such conduction and melting occur, deep penetration welding cannot take place because a stable void cannot be established, and the resulting weld will have a depth-to-width ratio of the order of unity.

In order to accomplish the necessary vaporization of the material at the focal point of the laser beam, and to avoid thermal conduction through the material which will cause a large molten pool of material, the incident power density of the beam on the surface must initially be very high. This is facilitated by the Gaussian distribution of the $TEM_{oo}$ mode of operation. If the reflectivity of the welding material is so high that insufficient energy to cause localized vaporization can be absorbed by the welding material within the prescribed short time, it may be necessary to instantaneously increase the power of the welding beam to initiate vaporization and establishment of the void. The surface absorption may also be increased artificially by a coating which is highly absorbent at the laser wavelength. Once vaporization occurs, the beam power can be reduced and relative movement between the workpiece and the beam can be maintained with a stable void. Once the void is formed, beam power must be reduced to its steady welding level or a hole may result. Similar initiation may be obtained by reducing weld speed initially with beam power held constant.

If the power density is sufficiently high, the void formed permits beam penetration into the material and acts as a black body cavity in trapping all the beam energy incident on the surface. As noted previously, however, the void is statically unstable and would result in hole formation if relative motion between the beam and the workpiece did not occur. Specifically, it is required that the beam move relative to the workpiece at least about 10 focused spot diameters, i.e., $V \geq 10d/t_{exp}$, in the time required for hole drilling. Under these conditions, the void becomes dynamically stable with a small area of molten material located adjacent to the line heat source, and the void translates through the material forming a zone of highly heated molten material which fuzes forming a weld whose characteristics can be predicted on the basis of the assumption of a moving line heat source distributed through the material. The width of the weld zone will be of the order of the spot diameter, indicating absence of appreciable lateral thermal diffusion, and its depth will be proportional to the incident total power for a given weld speed.

For spot welding, energy deposition occurs as described but the energy density is not high enough to cause removal of material. No relative motion occurs between the beam and the workpiece.

Tests have been performed using an electric discharge convective $CO_2$ laser operating as an amplifier in the $TEM_{oo}$ mode with an output in the range from 3 to 4 kilowatts. The laser output beam was directed upon a mirror aligned to provide a focus upon a workpiece located off axis from the primary laser beam. Reflecting optics such as mirror 14 in FIG. 1 were used, but transmitting optics may also be used if such optics capable of operating at the required power levels are available.

The focusing mirror 14 may have any geometric shape, e.g., spherical, elliptical, parabolic, etc. suitable for attainment of a sharply defined focal spot. Spherical aberration due to off-axis focusing with a spherical mirror may be minimized by restricting the off-axis position of the workpiece to angles less than about 10° or by utilization of two mirrors with relative location and curvature chosen to effect mutual aberration cancellation. Such techniques are well known.

The test workpiece was mounted on a three-axis positioning table having a one-axis motorized drive. Table speed was controlled by a variable speed drive motor. Suitable design to minimize table friction such as the use of ball bushings was used to provide the smooth, continuous motion essential to attainment of uniform welds.

Tests were performed using a variety of metals at two different focal points, both with and without a shielding gas to prevent surface oxidation, and at welding speeds of up to 50 inches per minute.

Figure 2:
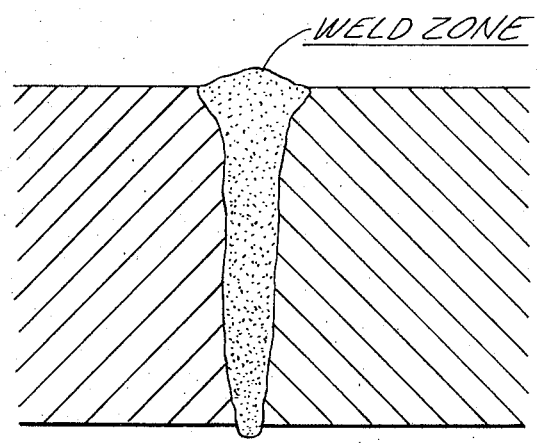
FIG. 2 shows a typical deep penetration laser butt weld accomplished by the teachings of this invention.

Typical results of the experiments producing a deep penetration weld are shown in FIG. 2. This figure shows a butt weld performed by a laser beam in ¼ inch thick stainless steel at a weld speed of 50 inches per minute. The laser power was in the range of 3 to 4 kilowatts. The penetration shown is similar to that obtained with an electron beam in vacuum, but the weld of FIG. 2 was accomplished in atmosphere without the benefit of a protective environment.

Continuous wave laser operation is preferred for deep penetration welds, but quasi-continuous wave operation at a frequency $\geq$ 1 KHz may also be used. For this purpose, frequency and pulse duration must be selected which prevent collapse of the void between pulses.

Deep penetration welds have been produced in both lap and butt configurations. These welds are characterized by a relatively small heat affected zone and a depth-to-width ratio of 7 or more. Good bonds were established as verified by x-ray and tensile tests.

It is also desirable but not essential for deep penetration laser welding that large F/D (beam focal distance to beam aperature) focusing optics be used so that internal reflection and propagation of beam energy into the material is enhanced due to grazing beam incidence. Further, F/D values greater than four are preferred because the depth of field is correspondingly longer and the criticality of workpiece location is thereby reduced.

Once deep penetration welding is initiated by means of a laser beam, the power density, power, relative movement, depth of beam penetration, etc. may be determined experimentally in accordance with guidelines formulated in standard electron beam deep penetration welding techniques.

While this invention has been described in its preferred embodiment, it will be apparent to those skilled in the art that modifications may be made to the method and apparatus without departing from the scope of the invention as hereinafter claimed.

We claim:

1. The method of forming a continuous weld having a depth substantially greater than its width in a relatively thick workpiece material by means of direct energy transfer into the material to melt the material to the desired weld depth and without relying on heat conduction into the material from the surface thereof which comprises generating a continuous beam of coherent optical radiation in a fundamental mode by a continuous wave laser, amplifying said beam of radiation to a power of at least 3 kw in a medium containing $CO_2$, focusing the beam of radiation at a point at or in the vicinity of the surface of the workpiece material to be welded so that the power density of the beam on the surface of the workpiece material is in the range between $10^6$ and $10^8$ watts/in.$^2$, said power density being maintained at a value within said range sufficient to overcome losses caused by surface reflectivity of said workpiece material and to permit localized absorption of said beam by said workpiece material at the point of initial impingement, maintaining the beam at the point of initial impingement on the workpiece surface for a time, depending on the beam power density and the reflectivity of the workpiece material at the wavelength of said radiation beam, which is sufficient to initiate vaporization of the workpiece material at the point of beam impingement and to create a void in said material to the desired depth of penetration before sufficient energy has been conducted to the surrounding workpiece material to cause melting thereof, said beam penetrating into the void and melting the laterally adjacent material by direct energy transfer from the beam to the material over the entire depth of the penetrating beam, and moving the beam relative to the workpiece material so that the beam moves across the surface of the workpiece material a distance of at least ten times the cross-sectional width of the beam at its point of initial impingement on the workpiece prior to the time that a stable hole would be formed in said workpiece material at said point of initial impingement if movement did not occur, said movement causing the void to become dynamically stable and to translate through the workpiece material with a small area of molten material located adjacent the beam, fusion of said molten material occurring directly behind the beam to form a weld whose width is on the order of the beam diameter and whose depth is substantially greater than its width and proportional to the total power incident on said workpiece material as a function of the rate of relative movement.

2. The method of claim 1 and including the step of reducing the power of said beam after said stable void is formed in the workpiece material.

3. The method of claim 1 and including the step of increasing the speed of movement of said beam relative to said workpiece material when said stable void is formed in the workpiece material.

4. The method of forming a continuous weld having a depth substantially greater than its width in a relatively thick workpiece material of at least 0.04 inch thickness by means of direct energy transfer into the material to melt the material to the desired weld depth and without relying on heat conduction into the material from the surface thereof which comprises generating a continuous beam of coherent optical radiation in the TEM$_{oo}$ mode by a continuous wave laser, amplifying said beam of radiation to a power of at least 3 kw in a $CO_2$ amplifier, focusing the beam of radiation at a point at or in the vicinity of the surface of the workpiece material to be welded so that the power density of the beam on the surface of the workpiece material is between $10^6$ and $10^8$ watts/in.$^2$, maintaining the beam at its point of initial impingement on the workpiece material fro a time, depending on the beam power density and the reflectivity of the workpiece material at the wavelength of said radiation beam, which is sufficient to initiate vaporization of the workpiece material at the point of beam impingement and to create a void in said material to the desired depth of penetration before sufficient energy has been conducted to the surrounding workpiece material to cause melting thereof, said beam penetrating into the void and melting the laterally adjacent material by direct energy transfer from the beam to the material over the entire depth of the penetrating beam, and moving the beam relative to the workpiece material so that the beam moves across the surface of the workpiece material a distance of at least ten times the cross-sectional width of the beam at its point of initial impingement on the workpiece material prior to the time that a stable hole would be formed in said workpiece material at said point of initial impingement if movement did not occur, said movement causing the void to become dynamically stable and to translate through the workpiece material with a small area of molten material located adjacent the beam, fusion of said molten material occurring directly behind the beam to form a weld whose width is on the order of the beam diameter and whose depth is substantially greater than its width and proportional to the total power incident on said workpiece material as a function of the rate of relative movement.

* * * * *